United States Patent
Yu et al.

(10) Patent No.: US 10,803,205 B1
(45) Date of Patent: Oct. 13, 2020

(54) RETRIEVING PUBLIC DATA FOR BLOCKCHAIN NETWORKS USING TRUSTED EXECUTION ENVIRONMENTS

(71) Applicant: Alibaba Group Holding Limited, George Town (KY)

(72) Inventors: Yirong Yu, Hangzhou (CN); Honglin Qiu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/714,414

(22) Filed: Dec. 13, 2019

Related U.S. Application Data

(63) Continuation of application No. PCT/CN2019/096036, filed on Jul. 15, 2019, and a continuation-in-part of application No. PCT/CN2019/080478, filed on Mar. 29, 2019, and a continuation-in-part of application No. PCT/CN2019/079800, filed on Mar. 27, 2019.

(51) Int. Cl.
*G06F 21/64* (2013.01)
*H04L 9/30* (2006.01)
*H04L 9/32* (2006.01)

(52) U.S. Cl.
CPC ............ *G06F 21/64* (2013.01); *H04L 9/3073* (2013.01); *H04L 9/3247* (2013.01)

(58) Field of Classification Search
CPC ...... G06F 21/64; H04L 9/3073; H04L 9/3247
See application file for complete search history.

(56) References Cited

U.S. PATENT DOCUMENTS

| 9,680,872 B1 | 6/2017 | Roth et al. |
| 10,243,748 B1 | 3/2019 | Callan et al. |

(Continued)

FOREIGN PATENT DOCUMENTS

| CN | 107003916 | 8/2017 |
| CN | 107079036 | 8/2017 |

(Continued)

OTHER PUBLICATIONS

Ahmed et al., "Turning Trust Around: Smart Contract-Assisted Public Key Infrastructure," 2018 17th IEEE International Conference on Trust, Security and Privacy in Computing and Communications/ 12th IEEE International Conference on Big Data Science and Engineering (TrustCom/BigDataSE).*

(Continued)

*Primary Examiner* — Roderick Tolentino
(74) *Attorney, Agent, or Firm* — Fish & Richardson P.C.

(57) ABSTRACT

Disclosed herein are methods, systems, and apparatus, including computer programs encoded on computer storage media, for performing an attestation verification. One of the methods includes sending an attestation request to a relay system node by a relay system controller. The relay system controller receives an attestation evidence of the relay system node from the relay system node. The relay system controller sends the attestation evidence of the relay system node to an attestation verification server. The relay system controller receives an attestation verification report from the attestation verification server. The relay system controller sends the attestation verification report to a relay system smart contract.

18 Claims, 7 Drawing Sheets

(56) References Cited

U.S. PATENT DOCUMENTS

| | | | |
|---|---|---|---|
| 10,250,395 | B1* | 4/2019 | Borne-Pons .......... H04L 9/3255 |
| 2006/0206616 | A1 | 9/2006 | Brown |
| 2007/0073876 | A1 | 3/2007 | Shima |
| 2012/0017090 | A1 | 1/2012 | Gould et al. |
| 2016/0191524 | A1 | 6/2016 | Bathija et al. |
| 2017/0270319 | A1 | 9/2017 | Salmon-Legagneur et al. |
| 2017/0352027 | A1 | 12/2017 | Zhang et al. |
| 2017/0353309 | A1 | 12/2017 | Gray |
| 2017/0359184 | A1 | 12/2017 | Camenisch et al. |
| 2018/0089758 | A1 | 3/2018 | Stradling et al. |
| 2018/0097635 | A1 | 4/2018 | Moses |
| 2018/0191503 | A1 | 7/2018 | Alwar et al. |
| 2018/0204213 | A1 | 7/2018 | Zappier et al. |
| 2018/0219685 | A1 | 8/2018 | Deery et al. |
| 2018/0241572 | A1* | 8/2018 | Miele ................. H04L 63/08 |
| 2018/0254898 | A1 | 9/2018 | Sprague et al. |
| 2018/0287780 | A1 | 10/2018 | Safford et al. |
| 2018/0309567 | A1 | 10/2018 | Wooden |
| 2019/0034459 | A1 | 1/2019 | Qiu |
| 2019/0036682 | A1 | 1/2019 | Qiu |
| 2019/0036711 | A1 | 1/2019 | Qiu |
| 2019/0058577 | A1 | 2/2019 | Bowman et al. |
| 2019/0058696 | A1 | 2/2019 | Bowman et al. |
| 2019/0116038 | A1* | 4/2019 | Sprague ............... H04L 9/3234 |
| 2019/0158275 | A1 | 5/2019 | Beck |
| 2019/0164153 | A1 | 5/2019 | Agrawal et al. |
| 2019/0164220 | A1* | 5/2019 | Raj ....................... G06Q 40/02 |
| 2019/0190724 | A1* | 6/2019 | Sundaresan .......... H04L 9/3239 |
| 2019/0207755 | A1 | 7/2019 | Gu et al. |
| 2019/0245693 | A1 | 8/2019 | Lyer et al. |
| 2019/0281028 | A1* | 9/2019 | Gillan ................. H04L 63/0861 |
| 2019/0288854 | A1 | 9/2019 | Xie et al. |
| 2019/0303541 | A1* | 10/2019 | Reddy ................... H04L 9/0643 |
| 2019/0311392 | A1 | 10/2019 | Swamidurai |
| 2019/0312863 | A1 | 10/2019 | Chow et al. |
| 2020/0067922 | A1* | 2/2020 | Avetisov ............... H04L 9/0643 |
| 2020/0089915 | A1* | 3/2020 | Falk ....................... H04L 9/3297 |
| 2020/0167770 | A1* | 5/2020 | Kurian ................. H04L 9/0643 |

FOREIGN PATENT DOCUMENTS

| | | |
|---|---|---|
| CN | 108073829 | 5/2018 |
| CN | 108171083 | 6/2018 |
| CN | 108305170 | 7/2018 |
| CN | 107579826 | 12/2018 |
| CN | 108965342 | 12/2018 |
| CN | 208335190 | 1/2019 |
| CN | 109299338 | 2/2019 |
| CN | 109327512 | 2/2019 |
| EP | 3297206 | 3/2018 |
| WO | WO 2018193355 | 10/2018 |

OTHER PUBLICATIONS

Yoon et al., "Verifying the Integrity of Private Transaction Information in Smart Contract using Homomorphic Encryption," 2019 IEEE Eurasia Conference on IOT, Communication and Engineering (ECICE) Year: 2019 | Conference Paper | Publisher: IEEE.*

Crosby et al., "BlockChain Technology: Beyond Bitcoin," Sutardja Center for Entrepreneurship & Technology Technical Report, Oct. 16, 2015, 35 pages.

Ellis et al. [online], "ChainLink A Decentralized Oracle Network," Sep. 2017, retrieved on Nov. 26, 2019, retrieved from URL<https://link.smartcontract.com/whitepaper>, 38 pages.

Github.com [online], "Ontology Oracle," Jan. 10, 2019, retrieved on Nov. 26, 2019, retrieved from URL <https://github.com/ontio/ontology-oracle>, 10 pages.

Nakamoto, "Bitcoin: A Peer-to-Peer Electronic Cash System," www.bitcoin.org, 2005, 9 pages.

PCT International Search Report and Written Opinion in International Appl. No. PCT/CN2019079800, dated Jan. 2, 2020, 7 pages.

PCT International Search Report and Written Opinion in International Appl. No. PCT/CN2019080478, dated Dec. 30, 2019, 9 pages.

PCT International Search Report and Written Opinion in International Appl. No. PCT/CN2019096030, dated Dec. 27, 2019, 6 pages.

PCT International Search Report and Written Opinion in International Appl. No. PCT/CN2019096032, dated Dec. 27, 2019, 6 pages.

PCT International Search Report and Written Opinion in International Appl. No. PCT/CN2019096036, dated Jan. 2, 2020, 7 pages.

Software.intel.com [online], "Add Enhanced Security to Your Application," 2019, retrieved on Nov. 26, 2019, retrieved from URL<https://software.intel.com/en-us/sgx/details>, 3 pages.

Software.intel.com [online], "Develop & Deliver More Secure Solutions," 2019, retrieved on Nov. 26, 2019, retrieved from URL<https://software.intel.com/en-us/sgx>, 5 pages.

Software.intel.com [online], "Enhanced Security Features for Applications and Data In-use," 2019, retrieved on Nov. 26, 2019, retrieved from URL<https://software.intel.com/sites/default/files/managed/c3/8b/intel-sgx-product-brief-2019.pdf>, 4 pages.

Software.intel.com [online], "Intel Software Guard Extensions", 2019, retrieved on Nov. 26, 2019, retrieved from URL <https://software.intel.com/en-us/sgx>, 5 pages.

Wikipedia.org [online], "Trusted execution environment," Nov. 18, 2019, retrieved on Nov. 26, 2019, retrieved from URL<https://en.wikipedia.org/wiki/Trusted_execution_environment>, 6 pages.

Zhang et al., "Town Crier: An Authenticated Data Feed for Smart Contracts," The 23rd ACM Conference on Computer and Communicaions Security, Oct. 2016, 20 pages.

Extended European Search Report in European Application No. 19732236.5, dated May 18, 2020, 8 pages.

Extended European Search Report in European Application No. 19732212.6 dated Apr. 20, 2020, 11 pages.

* cited by examiner

US 10,803,205 B1

RETRIEVING PUBLIC DATA FOR BLOCKCHAIN NETWORKS USING TRUSTED EXECUTION ENVIRONMENTS

CROSS-REFERENCE TO RELATED APPLICATIONS

This application is a continuation of PCT Application No. PCT/CN2019/096036, filed on Jul. 15, 2019, and a continuation in part of (i) PCT Application No. PCT/CN2019/079800, filed on Mar. 27, 2019 and (ii) PCT Application No. PCT/CN2019/080478, filed on Mar. 29, 2019. The content of each of the foregoing applications is hereby incorporated by reference in its entirety.

TECHNICAL FIELD

This specification relates to providing data to a blockchain network from an external data source.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular use case. An example type of blockchain network can include consortium blockchain networks provided for a select group of entities, which control the consensus process, and includes an access control layer.

Smart contracts are programs that execute on blockchains. In some instances, the smart contract running on the blockchain requires input from outside of the blockchain to evaluate pre-defined rules and perform corresponding actions. However, the smart contract itself cannot directly access external data sources. Consequently, a relay agent can be used to retrieve external data, and submit the data to the blockchain for processing by the smart contract. This process, however, can result in security issues, such as potential attack vectors (e.g., distributed denial-of-service (DDoS) attacks). Further, each client may be required to individually authenticate the remote agent, which hinders scalability, and increases resource overhead (e.g., processors, memory, bandwidth).

Although techniques have been proposed for addressing security issues associated with data retrieval from external data sources, a more effective solution to address the security issues would be advantageous.

SUMMARY

This specification describes technologies for retrieval of data from external data sources for processing within a blockchain network. Embodiments of this specification are directed to a relay system that is used to retrieve publicly available data and/or services from the external data source.

In some embodiments, remote attestation is performed for each of a plurality of relay system nodes, the remote attestation resulting in a key pair (public key, private key) for each relay system node. Each relay system node operates using a trusted execution environment (TEE). A relay system smart contract is used for remote authentication of the relay system node, which can be audited publicly, eliminating the need for individual clients to repeat remote authentication. Authenticated relay system nodes are registered for use, and a relay system node is randomly selected for querying the external data source. A response that includes the result of the query is digitally signed using the private key of the relay system node. The response can be verified by the relay system smart contract using the public key of the relay system node.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
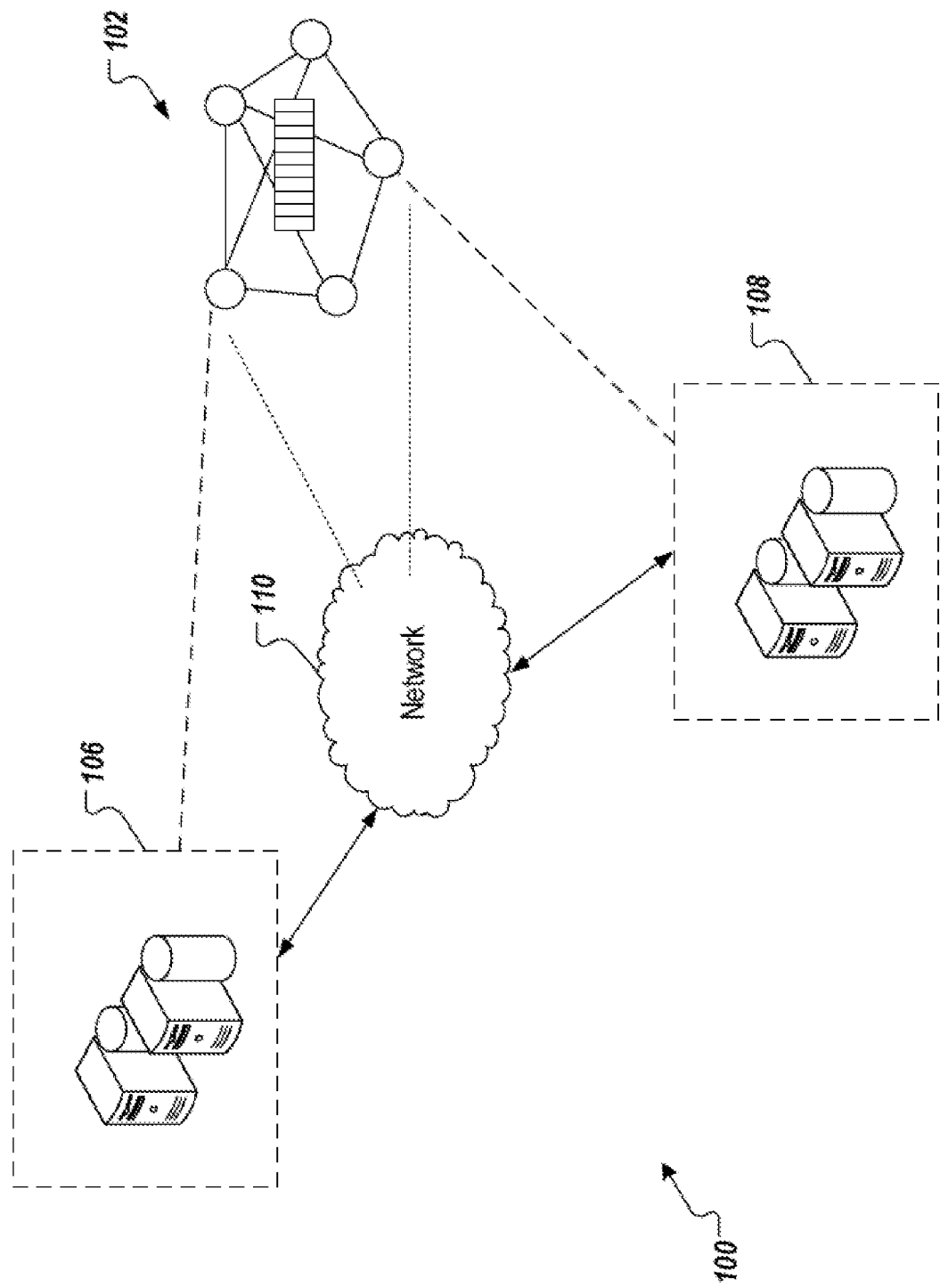
FIG. 1 is a diagram illustrating an example of an environment that can be used to execute embodiments of this specification.

This specification describes technologies for providing data to a blockchain network from an external data source. More particularly, and as described in further detail herein, embodiments of this specification are directed to a relay system that is used to retrieve publicly available data and/or services from the external data source.

In some embodiments, remote attestation is performed for each of a plurality of relay system nodes, the remote attestation resulting in a key pair (public key, private key) for each relay system node. Each relay system node operates using a trusted execution environment (TEE). A relay system smart contract is used for remote authentication of the relay system node, which can be audited publicly, eliminating the need for individual clients to repeat remote authentication. Authenticated relay system nodes are registered for use, and a relay system node is randomly selected for querying the external data source. A response that includes the result of the query is digitally signed using the private key of the relay system node. The response can be verified by the relay system smart contract using the public key of the relay system node.

The techniques described in this specification produce several technical effects. For example, the specification discloses a relay system including a relay system smart contract, a relay system controller, and a relay system node for facilitating querying internet data source by a blockchain, where the relay system controller is used for relaying data or requests between a user of the blockchain and the relay system node. As described herein, embodiments of this specification ensure the integrity of responses provided back to the blockchain network from external data sources. Accordingly, embodiments of this specification improve the integrity of communications between a blockchain network, and components of a relay system that is used to retrieve data that is external to the blockchain network. In this manner, potential attack channels for malicious users are mitigated to enhance security. As another example, the relay system of this specification facilitates avoiding a direct contact between the user and the relay system node, thereby avoiding exposing a position or access point of the relay system node. As such, the relay system node is less likely to be found and attacked by malicious actors over the network in many forms, such as, for example, DDoS attacks. This improves a security of the relay system node, thereby further improving a security of the communication between the blockchain network and the relay system node.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
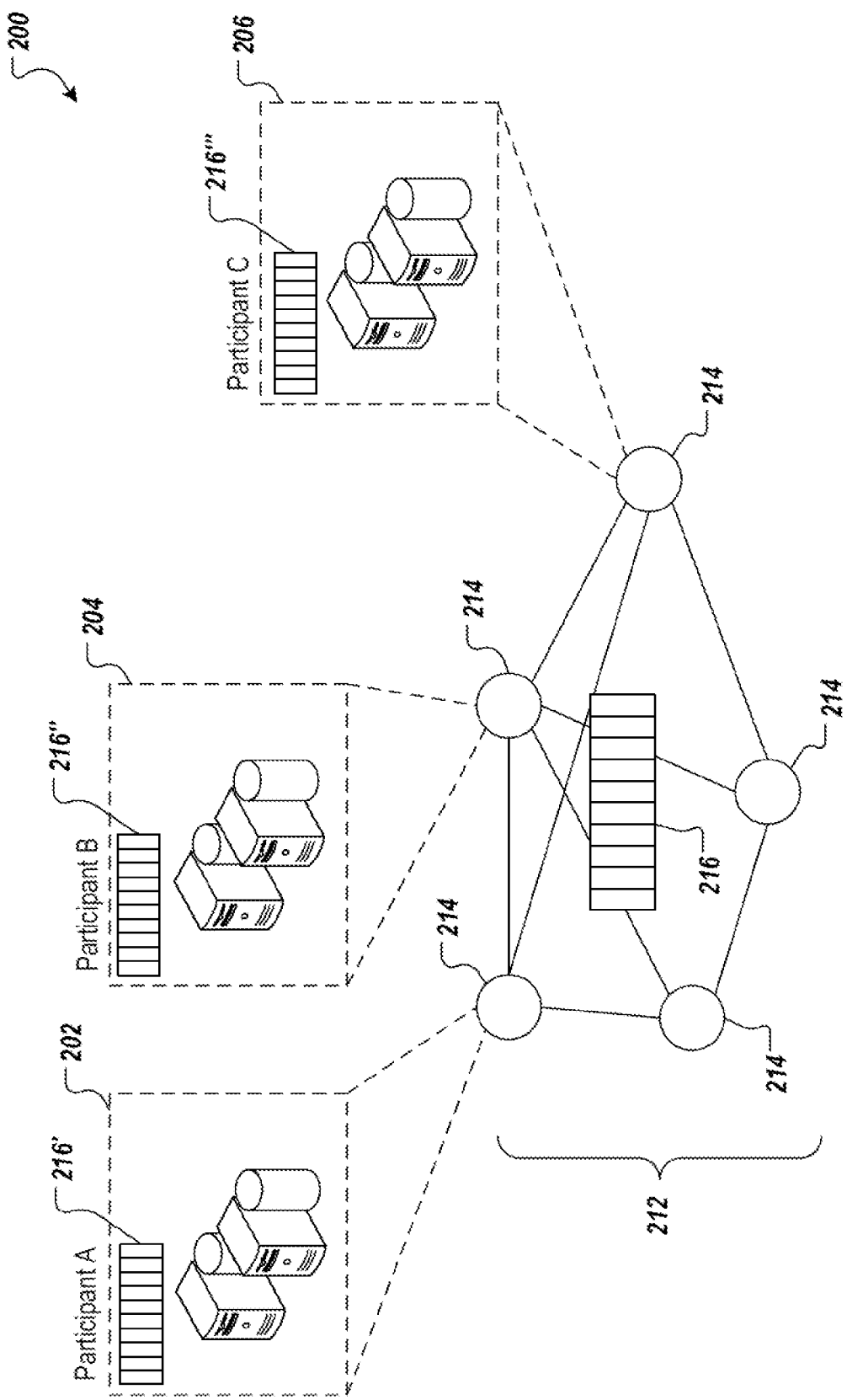
FIG. 2 is a diagram illustrating an example of a conceptual architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216'', and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some instances, a smart contract executing within the blockchain network requires input from outside of the blockchain network to evaluate pre-defined rules and perform corresponding actions. By way of non-limiting example, a stock quote might be needed for the smart contract to base a decision on, the stock quote coming from a data source external to the blockchain network. As another non-limiting example, account information for an account that is maintained outside of the blockchain network might be needed to for the smart contract to base a decision on. However, the smart contract itself cannot directly query external data sources.

Traditional approaches include use of a relay agent to retrieve external data, and submit the data to the blockchain for processing by the smart contract. For example, Internet-connected computer servers can provide open data services to Internet users generally. In some examples, data access services are provided through protocols such as, hypertext transfer protocol (HTTP), secure HTTP (HTTPS), and file transfer protocol (FTP). Any computing device connected to the Internet can access such services to obtain data (e.g., even without access credentials). Because a smart contract executing within a blockchain network cannot itself directly access the Internet-based service, an intermediate agent can be used to submit requests for, and retrieve data, and provide the data to the blockchain network for use by the smart contract.

An issue with this, however, is how to ensure that the agent accesses the data in a complete, non-compromised process. This can include, among other things, ensuring that the agent actually performed the access behavior, that the accessed service is a real, expected Internet service, that the request sent has not been tampered with, and that the returned data has not been tampered with. Further, it should also be ensured that the agent is the intended agent, rather than a counterfeiter.

In one traditional approach that uses SGX, the TA, or portion of the TA, executing in an enclave (enclave program) functions as a relay node (intermediate agent) to access external data sources. For example, the enclave program can send a query request (e.g., HTTPS request) to an Internet-based data source, and can provide the response to the smart contract that initiated the request. Such a traditional approach, however, has disadvantages. An example disadvantage is that each user needs to separately access and remotely authenticate the relay node. Because access to the relay node is directly exposed, an attacker (e.g., malicious user) can perform a distributed denial-of-service (DDoS) attack, or other forms of attach to block users from performing authentication of the relay node. Further, because the user logic is strongly coupled with the relay node key (e.g., SGX private key), it is difficult to implement a cluster of relay nodes to extend service availability, and/or disaster recovery handover from a downed relay node.

In view of the above context, embodiments of the present specification are directed to querying external data sources (e.g., Internet-based data sources) using a relay system and TEE. More particularly, and as described in further detail herein, embodiments of this specification provide for use of a smart contract to perform the TEE remote verification (remote attestation, described herein), thereby avoiding direct access by the user, or client to the relay node. In this manner, and among other advantages, the attack surface is reduced, which inhibits potential attack vectors, and the coupling between the user logic and the relay system is reduced, which enhances the scalability, and improves the data uplink service capability.

Figure 3:
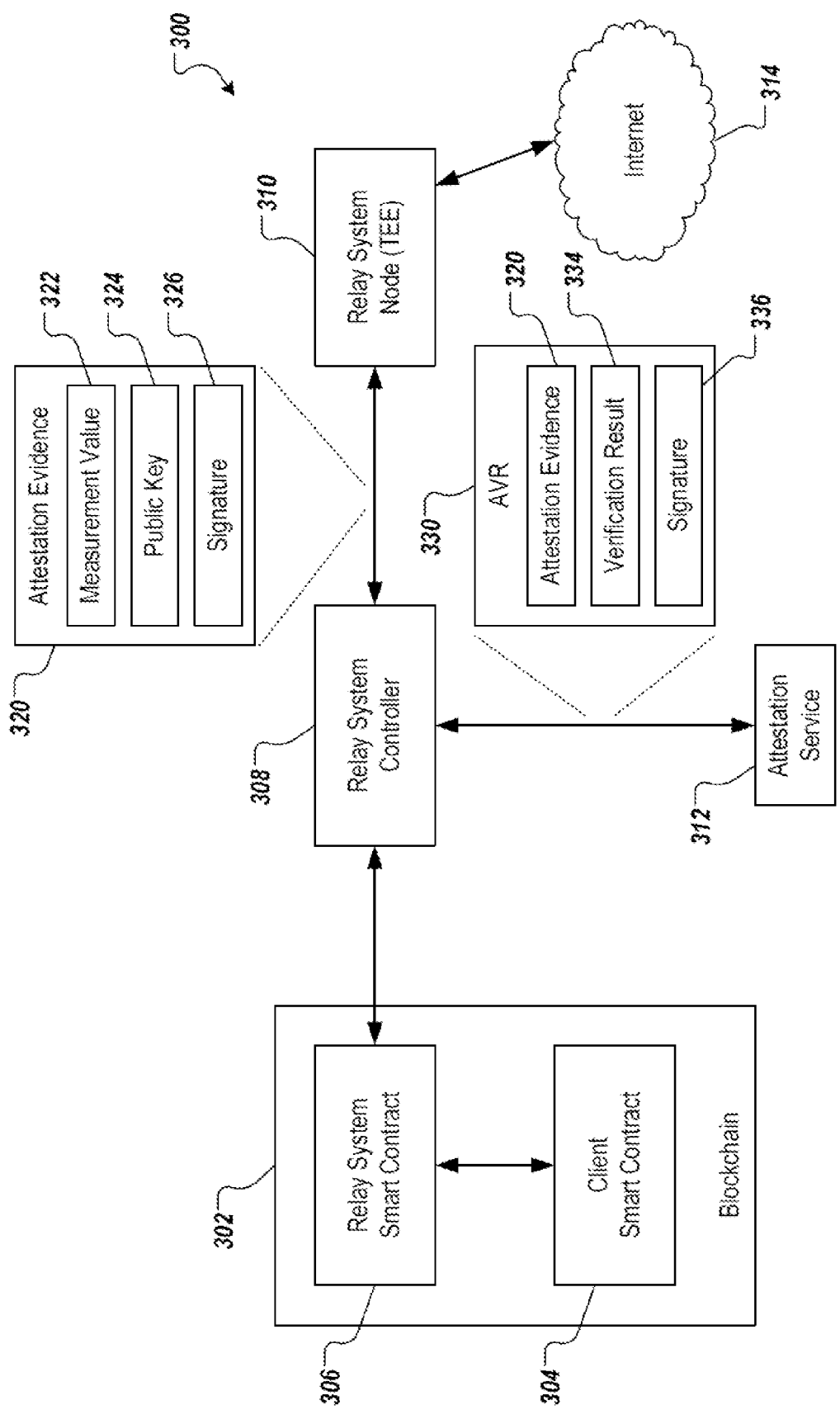
FIG. 3 is a diagram illustrating an example of a system in accordance with embodiments of this specification.

FIG. 3 is a diagram illustrating an example of a system 300 in accordance with embodiments of this specification. As shown, system 300 includes a blockchain 302, a relay system controller 308, a relay system node 310, an attestation service 312, and a network 314 (e.g., Internet). In the depicted example, the blockchain 302 includes a client smart contract 304 and a relay system smart contract 306. In some embodiments, the relay system node 310 is implemented using a TEE technology (e.g., Intel SGX). In general, the attestation service 312 verifies a legitimacy of the relay system node 310 for the client smart contract 304. An example attestation service includes IAS, described above. As described herein, the relay system smart contract 306, the relay system controller 308, and the relay system node 310 operate together as a relay system to relay data or requests from the client smart contract 304 to the network 314 (e.g., an external data source that is accessible through the network 314), and to relay data or request results from the network 314 to the client smart contract 304.

The client smart contract 304 is a smart contract that operates as a requester that requests data or service from the network 314. In some embodiments, an offline owner of the client smart contract 304, for example, a client or user (not shown), may send a data or request to or generate the data or service request at the client smart contract 304. The data or request may be a datagram element. The client smart contract 304 is communicatively coupled to the relay system contract 306. For example, the client smart contract 304 may send a request to the relay system smart contract 306 and receive a request result from the relay system smart contract 306.

As noted above, the relay system smart contract 306, the relay system controller 308, and the relay system node 310 operate together as a relay system to relay the data or requests from the client smart contract 304 to the network 314 and relay data or request results from the network 314 to the client smart contract 304. The relay system smart contract 306 is a smart contract that acts as a front end of the blockchain 302 within the relay system. The relay system smart contract 306 includes or operates as an application program interface (API) to the client smart contract 304 for processing and relaying the requests from the client smart contract 304 to the other components of the relay system (e.g., the relay system controller 308), and for processing and relaying request results from the relay system controller 308 to the client smart contract 304. In some embodiments, the relay system smart contract 306 verifies signatures associated with the request results before relaying the request results to the client smart contract 304.

The relay system controller 308 includes any suitable computer, processor, module, or computing element to relay requests from the relay system smart contract 306 to the relay system node 310 and to relay request results from the relay system node 310 to the relay system smart contract 306. As such, the relay system controller 308 operates as a monitoring entity that monitors the state of the relay system smart contract 306, because the relay system smart contract 306 does not have direct connectivity to the network 314.

The relay system controller 308 also relays attestation evidence 320 that indicates a legitimacy of the relay system node 310 from the relay system node 310 to the attestation service 312. In some embodiments, the attestation evidence 320 includes a measurement value 322 of the relay system node 310 and a signature 326 of the relay system node 310. The measurement value 322 of the relay system node 310 may include a hash value of an initial state of the relay system node 310. The signature 326 of the relay system node 310 included in the attestation evidence 320 may include the measurement value 322 of the relay system node 310 that is signed using an attestation key of the relay system node 310.

In some embodiments, the attestation key of the relay system node 310 includes an enhanced privacy identification (EPID) private key. EPID is an algorithm provided by Intel for attestation of a trusted system, while preserving privacy. In general, each of the members (e.g., a computer or a server) of a network is assigned an EPID private key for signing the attestation evidence, and a verifier of the attestation evidence in the network stores an EPID public key that is paired with the EPID private keys of the other members of the network. Each of the members can generate a signature of the attestation evidence using its own EPID private key, and the verifier can verify the signatures of the other members using the EPID public key. As such, the EPID keys can be used to prove that a device, such as a computer or a server, is a genuine device.

The attestation evidence 320 may further include a public key 324 that is generated by the relay system node 310. If the attestation evidence 320 includes the public key 324 that is generated by the relay system node 310, the signature 326 of the relay system node 310 includes the measurement value 322, and the public key 324 that are signed using the attestation key of the relay system node 310.

The relay system node 310 includes any suitable server, computer, module, or computing element to ingest and fulfill requests from the blockchain 302. For example, the relay system node 310 may receive and handle off-chain service requests from clients and query external data source in the network 314, for example such as, HTTPS-enabled Internet services. Before handling the requests from clients or client smart contract 304, the relay system node 310 may generate the attestation evidence 320, and send the attestation evidence 320 to the attestation service 312 for verifying a legitimacy of the relay system node 310. In some embodiments, the relay system node 310 generates a key pair including a public key 324 and a private key, and includes the public key 324 in the attestation evidence 320. The public key 324 may be further relayed by the relay system controller 308 to the relay system smart contract 306 for future communication between the relay system smart contract 306 and the relay system node 310. For example, the relay system node 310 may use the private key to sign request results, and the relay system smart contract 306 can use the public key 324 to verify the signed request results.

The attestation service 312 includes any suitable server, computer, module, or computing element to verify the legitimacy of the attestation evidence 320 that is forwarded by the relay system controller 308 from the relay system node 310. As noted above, the attestation evidence 320 includes a measurement value 322 of the relay system node 310, a signature 326 of the relay system node 310, and/or a public key 324 generated by the relay system node 310. Upon receiving the attestation evidence 320, the attestation service 312 verifies the signature 326 of the relay system node 310 in the attestation evidence 320, and generates an attestation verification report (AVR) 330.

The attestation service 312 verifies the signature 326 in the attestation evidence 320 using an attestation key of the attestation service 312. In some embodiments, the attestation key of the attestation service 312 includes an EPID public key that is paired with the EPID private key that the relay system node 310 used to sign the attestation evidence 320. After verifying the signature in the attestation evidence 320, the attestation service 312 generates the AVR 330 that includes the attestation evidence 320, a verification result 334 indicating whether the signature 326 in the attestation evidence 320 is valid, and a signature 336 of the attestation service 312.

In some embodiments, the AVR 330 includes the attestation evidence 320 excluding the signature 326 of the relay system node 310. For example, the AVR 330 may include the measurement value 322 of the relay system node 310, the public key 324 generated by the relay system node 310, the verification result 334, and the signature 336 of the attestation service 312. In some embodiments, the signature 336 of the attestation service 312 includes the attestation evidence 320 and the verification result 334 that are signed using a report signing key (e.g., a private key that the attestation service 312 uses to sign the attestation verification report) of the attestation service 312. Note that the report signing key can be different from the attestation key of the attestation service 312.

In some embodiments, the relay system includes a plurality of relay system nodes 310. The remote attestation process described herein is performed for each relay system node 310, and for each relay system node 310, a key pair (public key, private key) is provided. In some examples, as a relay system node 310 is verified, the relay system node 310 is logged with the relay system smart contract 306, and the relay system smart contract 306 is provided with the public key of the relay system node 310. Accordingly, each of a plurality of relay system nodes 310 are logged with the relay system smart contract 306, which stores the public key for each of the logged relay system nodes 310.

Figure 4:
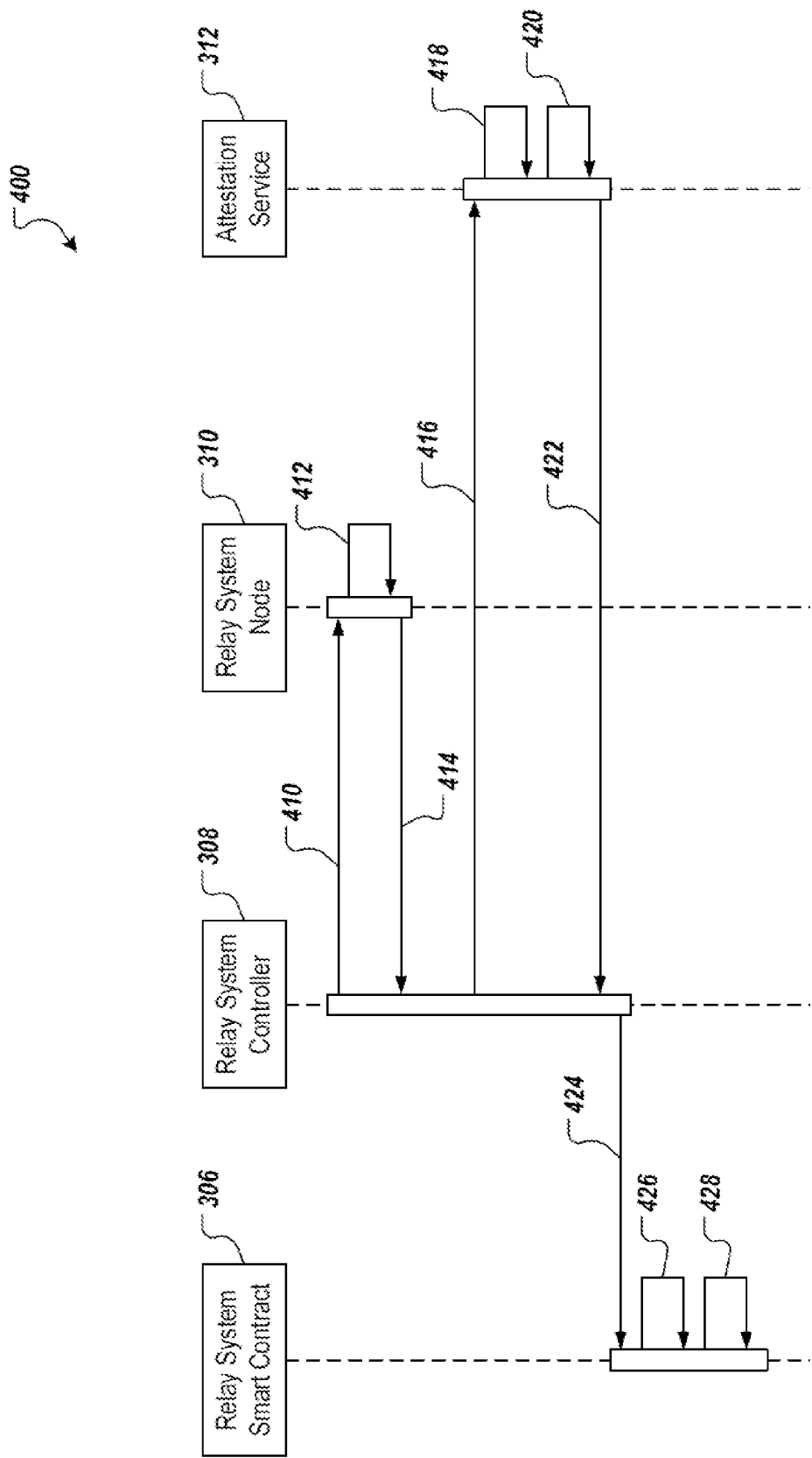
FIG. 4 is a signal flow illustrating an example of a process that can be executed in accordance with embodiments of this specification.

FIG. 4 depicts an example of a signal flow 400 in accordance with embodiments of this specification. The signal flow 400 represents an attestation verification process. For convenience, the process will be described as being performed by a system of one or more computers, located in one or more locations, and programmed appropriately in accordance with this specification. For example, a distributed system (e.g., the blockchain system 100 of FIG. 1; the system 300 of FIG. 3), appropriately programmed, can perform the process.

Generally, in operation, the relay system controller 308 receives attestation evidence from a relay system node 310, and sends the attestation evidence to the attestation service 312 to verify the attestation evidence. The relay system controller 308 receives an AVR from the attestation service 312 that indicates a legitimacy of the relay system node 310 based on a verification on a signature of the relay system node 310 in the attestation evidence. The relay system controller 308 further relays the AVR including a signature of the attestation service 312 to the relay system smart contract 306.

In the example of FIG. 4, the relay system controller 308 sends (410) an attestation request (e.g., a challenge) to the relay system node 310. The attestation request is sent to the relay system node 310 to request attestation evidence that indicates a legitimacy or validity of the relay system node 310. In some embodiments, the attestation evidence includes a measurement value of the relay system node 310 and a signature of the relay system node 310. The measurement value of the relay system node 310 may include a hash value of an initial state of the relay system node 310. For example, the measurement value of the relay system node 310 may include a hash value of a process code that is implemented on the relay system node 310.

In some embodiments, prior to sending the attestation request to the relay system node 310, the relay system controller 308 obtains the measurement value of the relay system node 310 and sends the measurement value to the relay system smart contract 306 for future use. For example, the relay system smart contract 306 may store the measurement value of the relay system node 310 and compare the stored measurement value to a measurement value in an AVR that the relay system controller 308 will forward from the attestation service 312 to the relay system smart contract 306.

In response to the attestation request, the relay system node 310 generates (412) attestation evidence. As noted above, the attestation evidence indicates a legitimacy or validity of the relay system node 310, and can include a measurement value of the relay system node 310 and a signature of the relay system node 310. In some embodiments, the attestation evidence further includes a public key that is generated by relay system node 310. For example, the relay system node 310 may generate a random cryptographic key pair including a private key and a public key using a predetermined key generation algorithm, for example such as, Rivest-Shamir-Adleman (RSA) algorithm. In some examples, the public key is provided in the attestation evidence that will be sent to the relay system smart contract 306, and can be used for future communication between the relay system smart contract 306 and the relay system node 310. For example, the relay system node 310 may use the private key to sign a request result and the relay system smart contract 306 can use the public key to verify the signed request result.

In some embodiments, the measurement value of the relay system node 310 includes a hash value of an initial state of the relay system node 310. The signature of the relay system node 310 in the attestation evidence includes the measurement value and the public key generated by the relay system node 310 that are signed using an attestation key of the relay system node 310. In some embodiments, the attestation key of the relay system node 310 includes an EPID private key. Attestation evidence that is signed using an EPID private key can be verified by a verifier using an EPID public key that is paired with the EPID private key to prove a genuineness of a device that generates the attestation evidence.

The relay system node 310 sends (414) the attestation evidence to the relay system controller 308. The attestation evidence that is sent to the relay system controller 308 can include a measurement value of a relay system node 310, a public key that is generated by the relay system node 310, and a signature of the relay system node 310 including the measurement value and the public key that are signed using an EPID private key of the relay system node 310.

The relay system controller 308 forwards (416) the attestation evidence sent from the relay system node 310 to the attestation service 312. In some embodiments, the relay system controller 308 sends an attestation verification request to the attestation service 312. The attestation verification request includes the attestation evidence sent from the relay system node 310, and some supplemental information, such as, for example, a descriptor that indicates whether the relay system node 310 uses the SGX platform service.

The attestation service 312 verifies (418) the attestation evidence in response to receiving the attestation evidence forwarded by the relay system controller 308. As noted, the attestation evidence includes a measurement value of the relay system node 310, a public key that is generated by the relay system node 310, and a signature of the relay system node 310. The attestation service 312 may verify the attestation evidence by verifying the signature of the relay system node 310 in the attestation evidence using an attestation key of the attestation service 312. For example, the attestation service 312 may verify the signature of the relay system node 310 using an EPID public key of the attestation service that is paired with an EPID private key the relay system node 310 uses to sign the attestation evidence.

If the attestation service 312 determines that the signature of the relay system node 310 in the attestation evidence is valid, the attestation service 312 may determine that the relay system node 310 is a genuine or legitimate device. If the attestation service 312 determines that the signature of the relay system node 310 in the attestation evidence is invalid, the attestation service 312 may determine that the relay system node 310 is not genuine or is an illegitimate device, and reject any subsequent data and requests from the relay system node 310.

The attestation service 312 generates (420) an AVR based on a verification of the attestation evidence. In some embodiments, the AVR can include the attestation evidence of the relay system node 310, an attestation verification result, and a digital signature of the attestation service 312. In some embodiments, the AVR may include the attestation evidence of the relay system node 310 excluding the signature of the relay system node 310. For example, the AVR may include the measurement value of the relay system node 310, the public key generated by the relay system node 310, the attestation verification result, and the signature of the attestation service 312.

The attestation verification result in the AVR indicates whether the signature of the relay system node 310 is valid. For example, the attestation verification result may include a value of "valid," or "OK" that indicates the signature of relay system node 310 is valid or a value of "invalid" that indicates the signature is invalid.

In some embodiments, the signature of the attestation service 312 includes the attestation evidence and the attestation verification result that are signed using a report signing key. The report signing key may be a private key that the attestation service 312 uses to sign the AVR. In some embodiments, the report signing key is generated by the attestation service 312 using a predetermined key generated algorithm. For example, the report signing key may be generated using the RSA-Secure Hash Algorithm (SHA) 256. Note that the report signing key is different from the attestation key (e.g., EPID public key) that the attestation service 312 uses to verify the attestation evidence.

In some embodiments, the attestation service 312 sends (422) the AVR to the relay system controller 308. As noted above, the AVR includes a cryptographically signed report of verification of identity of the relay system node 310, and can include the attestation evidence of the relay system node 310, an attestation verification result, and a digital signature of the attestation service 312.

In some embodiments, the relay system controller 308 forwards (424) the AVR to the relay system smart contract 306 after receiving the AVR from the attestation service 312. The relay system smart contract 306 verifies (426) the AVR. For example, the relay system smart contract 306 may verify the signature of the attestation service 312 in the AVR. In some embodiments, the relay system smart contract 306 verifies the signature of the attestation service 312 using a report signing certificate. The report signing certificate may be an X.509 digital certificate. The report signing certificate may include a public key that is generated by the attestation service 312 and that is paired with the report signing key the attestation service 312 uses to sign the AVR. If the relay system smart contract 306 verifies that the signature of the attestation service 312 in the AVR is valid, the relay system smart contract 306 determines that the AVR is indeed sent by the attestation service 312. If the relay system smart contract 306 determines that the signature of the attestation service 312 in the AVR is invalid, the relay system smart contract 306 determines that the attestation verification report is not genuine, and will reject the AVR. The relay system smart contract 306 may further inspect the attestation verification result in the AVR to determine whether the attestation evidence of the relay system node 310 is valid. In some embodiments, the relay system smart contract 306 further compares the measurement value in the attestation evidence with a measurement value that is pre-stored in the relay system smart contract 306 to determine whether the attestation evidence is valid.

The relay system smart contract 306 registers (428) the relay system node 310 as a valid or legitimate device in response to determining that the AVR is genuine and that the attestation evidence of the relay system node 310 is valid. The relay system smart contract 306 may further store the public key that is included in the attestation evidence in the service and that is generated by the relay system node 310. The public key will be used by the relay system smart contract 306 for future communication between the relay system smart contract 306 and the relay system node 310.

As described above, the signal flow 400 of FIG. 4 can be performed for each of a plurality of relay system nodes 310. In this manner, each of a plurality of relay system nodes 310 are logged with the relay system smart contract 306, which stores the public key for each of the logged relay system nodes 310.

Figure 5:
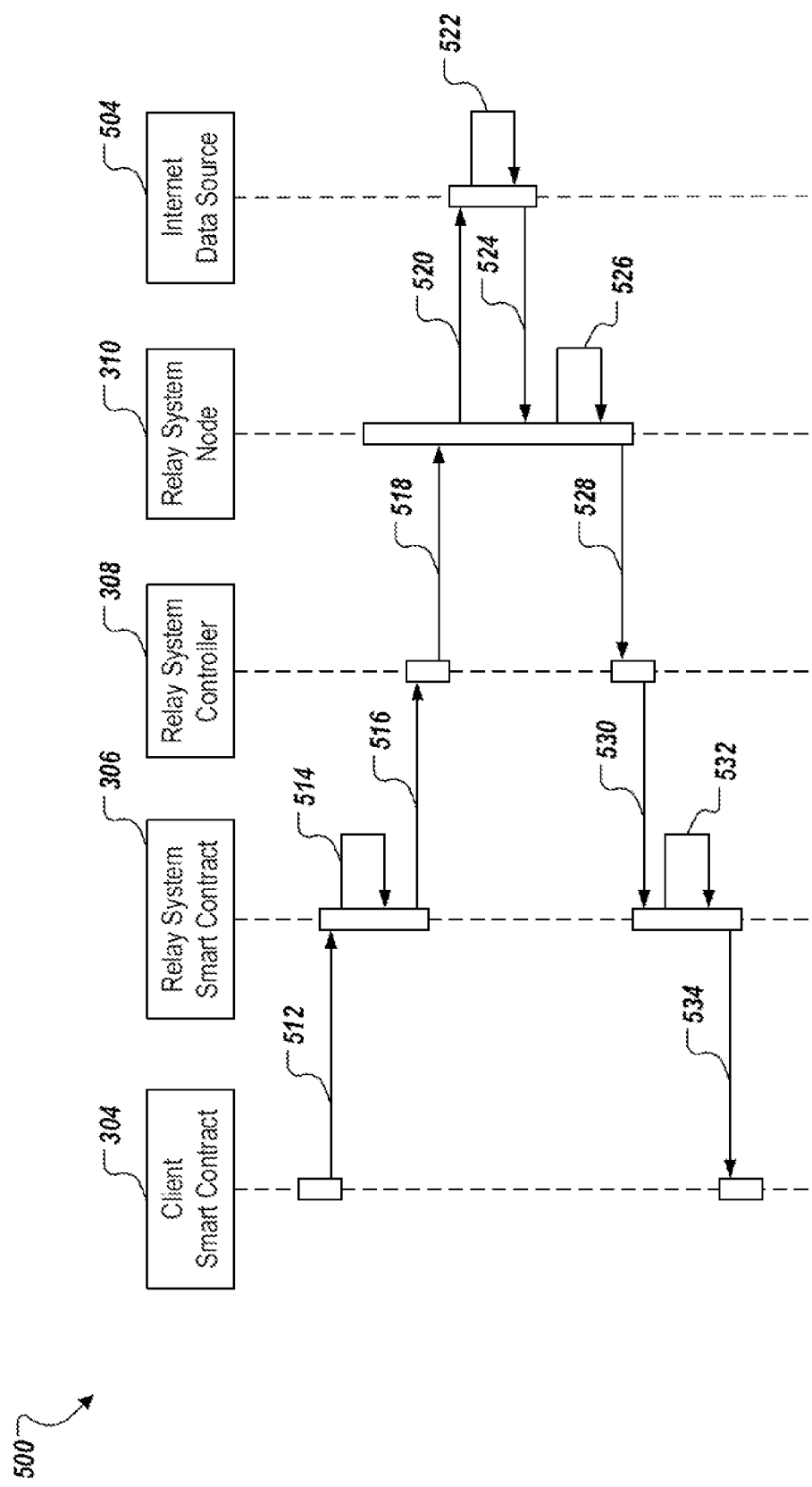
FIG. 5 is a signal flow illustrating an example of a process that can be executed in accordance with embodiments of this specification.

FIG. 5 depicts an example of a process 500 for verifying requests. For convenience, the process 500 will be described as being performed by a system of one or more computers, located in one or more locations, and programmed appropriately in accordance with this specification. For example, a distributed system (e.g., the blockchain system 100 of FIG. 1 and the system 300 of FIG. 3), appropriately programmed, can perform the process 500.

Generally in operation, a client smart contract 304 generates a request that will be relayed to the relay system node 310 through the relay system smart contract 306, and the relay system controller 308. The relay system node 310 queries an Internet data source 504. In some examples, the Internet data source 504 is a public data source, and credentials are not required for access. The relay system node 310 receives a response from the Internet data source 314, and the response is returned to the client smart contract 304 in accordance with embodiments of this specification.

In further detail, the user client smart contract 304 sends (512) a request for data or service from the Internet-based data source 504. The request is sent from the client smart contract 304 to the relay system smart contract 306. In some examples, the request may be a request for publicly available data from a publicly accessible website. The request may include a plaintext portion, such as, for example, a web address (URL) of the Internet data source 504, and one or more request parameters (e.g., parameters indicating the data, and/or service that is requested). In response to receiving the request, the relay system smart contract 306 selects (514) a relay system node 310 from a plurality of relay system nodes 310. For example, and as described herein, a plurality of relay system nodes 310 can be registered with the relay system smart contract 306. In some examples, the relay system smart contract 306 randomly selects a relay system node 310 from the plurality of relay system nodes 310.

The relay system smart contract 306 sends (516) the request to the relay system controller 308, which sends (518) the request to the relay system node 310. In some examples, the relay system smart contract 306 sends the request with an indicator of the relay system node 310 that is to receive the request (e.g., the relay system node 310 that was selected by the relay system smart contract 306). For example, the request can be modified by the relay system smart contract 306 to include an identifier (e.g., URL) of the relay system node 310. In some examples, the relay system smart contract 306 sends the request as a log message.

In response to receiving the request, the relay system node 310 queries (520) the Internet data source 504. For example, the relay system node 310 can formulate the query to request data from the Internet data source 504 (e.g., using an HTTP GET method). In some examples, the query can include the one or more request parameters. In response to receiving the query, the Internet data source 504 processes (522) the query to provide a response. For example, the Internet data source 504 can process the one or more request parameters to identify data that is responsive to the one or more request parameters, and provide a result that includes the data. The Internet data source 504 sends (524) the result to the relay system node 310.

The relay system node 310 processes (524) the result to provide a response. In accordance with embodiments of this specification, the relay system node 310 signs the result using its private key to provide the response. As described herein, the private key is generated during the remote attestation of the relay system node 310. In further detail, the result, or at least a portion of the result (e.g., the data) is processed by the relay system node 310 through a hash function to provide a first hash value. An example of a hash function includes, without limitation, SHA-256. The relay system node 310 generates a digital signature based on the first hash value and the private key. For example, the first hash value and the private key are processed through a signature algorithm, which provides the digital signature. The relay system node 310 provides the response, which includes the results (e.g., the data) and the digital signature. The relay system node 310 sends (528) the response to the relay system controller 308, which sends (530) the response to the relay system smart contract 306.

The relay system smart contract 306 processes (532) the response to ensure the integrity of the response. In accordance with embodiments of the present disclosure, the relay system smart contract 306 processes the result (e.g., the data) through a hash function (e.g., SHA-256) to provide a second hash value. The relay system smart contract 306 processes the digital signature and the public key of the relay system node 310 through a verification algorithm to provide the first hash value. For example, the relay system smart contract 306 decrypts the digital signature using the public key to reveal the first hash value. As described herein, the public key is generated during the remote attestation of the relay system node 310.

The relay system smart contract 306 verifies the integrity of the response based on the first hash value and the second hash value. For example, the relay system smart contract 306 compares the first hash value to the second hash value. If the first hash value and the second hash value are not the same, the response has been tampered with, and is untrusted. Consequently, the relay system smart contract 306 does not provide the result (e.g., the data) to any downstream components (e.g., the client smart contract), and/or can flag an error. If the first hash value and the second hash value are the same, the integrity of the response is intact. Consequently, the relay system smart contract 306 provides the result (e.g., the data) to the client smart contract 304 for further processing.

Figure 6:
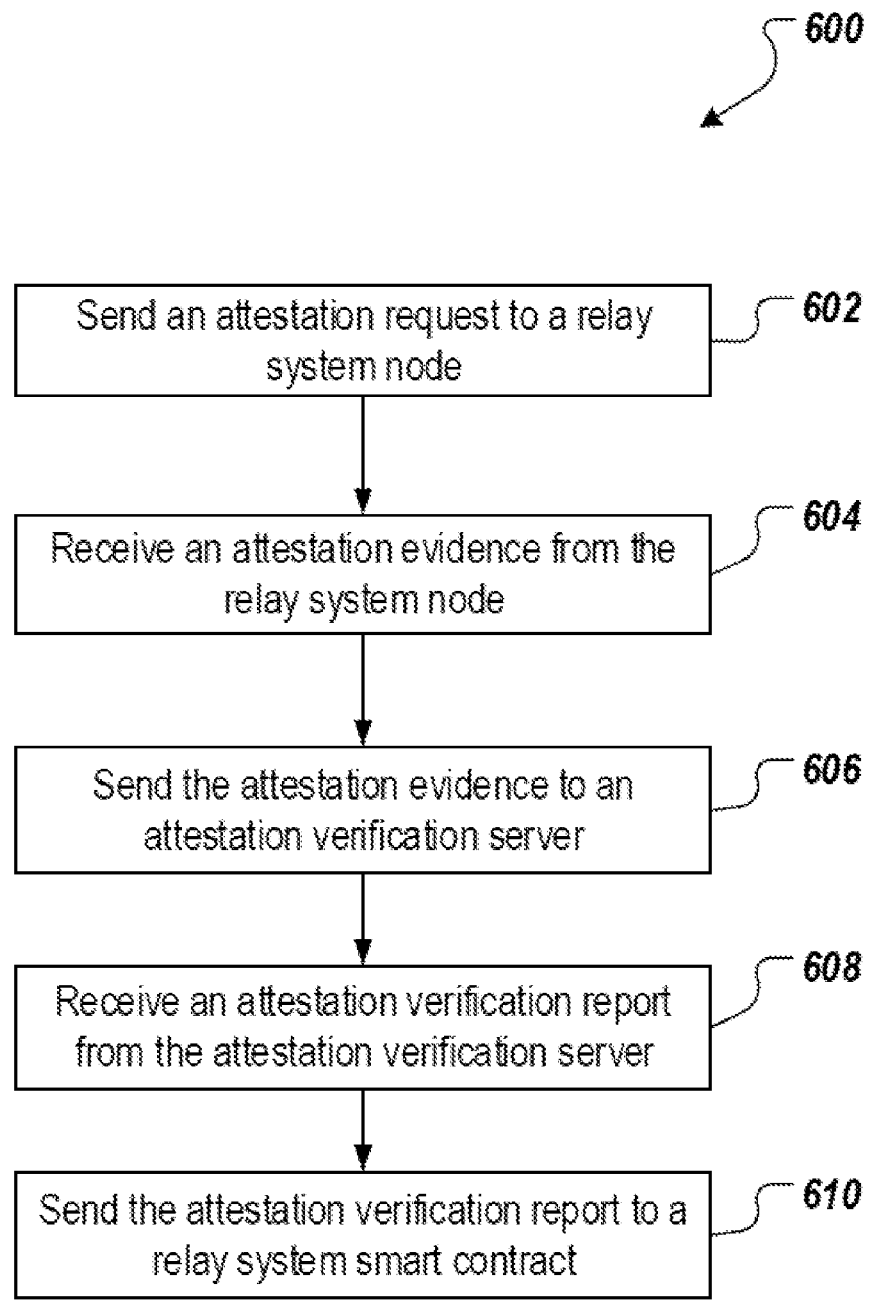
FIG. 6 is a flowchart illustrating an example of a process that can be executed in accordance with embodiments of this specification.

FIG. 6 is a flow chart illustrating an example of a process 600 that can be executed in accordance with embodiments of this specification. In some embodiments, the example process 600 may be performed using one or more computer-executable programs executed using one or more computing devices. In some examples, the example process 600 can be performed by a relay system for retrieving data that is external to a blockchain network (e.g., the relay system smart contract 306, the relay system controller 308, the relay system node 310 of FIG. 3).

At 602, a relay system controller sends an attestation request to a relay system node that requests an attestation evidence from the relay system node. In some embodiments, the attestation evidence indicates a validity of the relay system node. In some embodiments, prior to the relay system controller sending the attestation request, a relay system smart contract obtains the measurement value of the relay system node from the relay system node and stores the measurement value in the relay system smart contract. In some embodiments, the relay system contract executes on a blockchain network node of a blockchain network. In some embodiments, the relay system controller and the relay system node are located external to the blockchain network.

At 604, the relay system controller receives an attestation evidence of the relay system node from the relay system node. In some embodiments, the attestation evidence of the relay system node includes a measurement value of the relay system node, a public key of the relay system node, and a digital signature of the relay system node. In some embodiments, the measurement value of the relay system node includes a hash value of a process code that is implemented on the relay system node. In some embodiments, the digital signature of the relay system node includes the measurement value and the public key of the relay system node that are signed using an attestation private key of the relay system node.

At 606, the relay system controller sends the attestation evidence of the relay system node to an attestation verification server. In some embodiments, the attestation verification server verifies the digital signature of the relay system node in the attestation evidence of the relay system node using an attestation public key of the attestation server.

At 608, the relay system controller receives an attestation verification report from the attestation verification server. In some embodiments, the attestation verification report includes the attestation evidence of the relay system node, an attestation verification result, and a digital signature of the attestation verification server.

At 610, the relay system controller sends the attestation verification report to a relay system smart contract. In some embodiments, the relay system smart contract determines whether the attestation verification report in valid. In some embodiments, the relay system smart contract determines whether the digital signature of the attestation verification server is valid. In some embodiments, the relay system smart contract determines whether the measurement value of the relay system node that is in the attestation verification report matches a measurement value of the relay system node that the relay system smart contract obtains from the relay system controller. In some embodiments, in response to determining that the attestation verification report is valid, the relay system smart contract determines that the public key of the relay system is valid. In some embodiments, the relay system smart contract stores the public key of the relay system node in the relay system smart contract.

Figure 7:
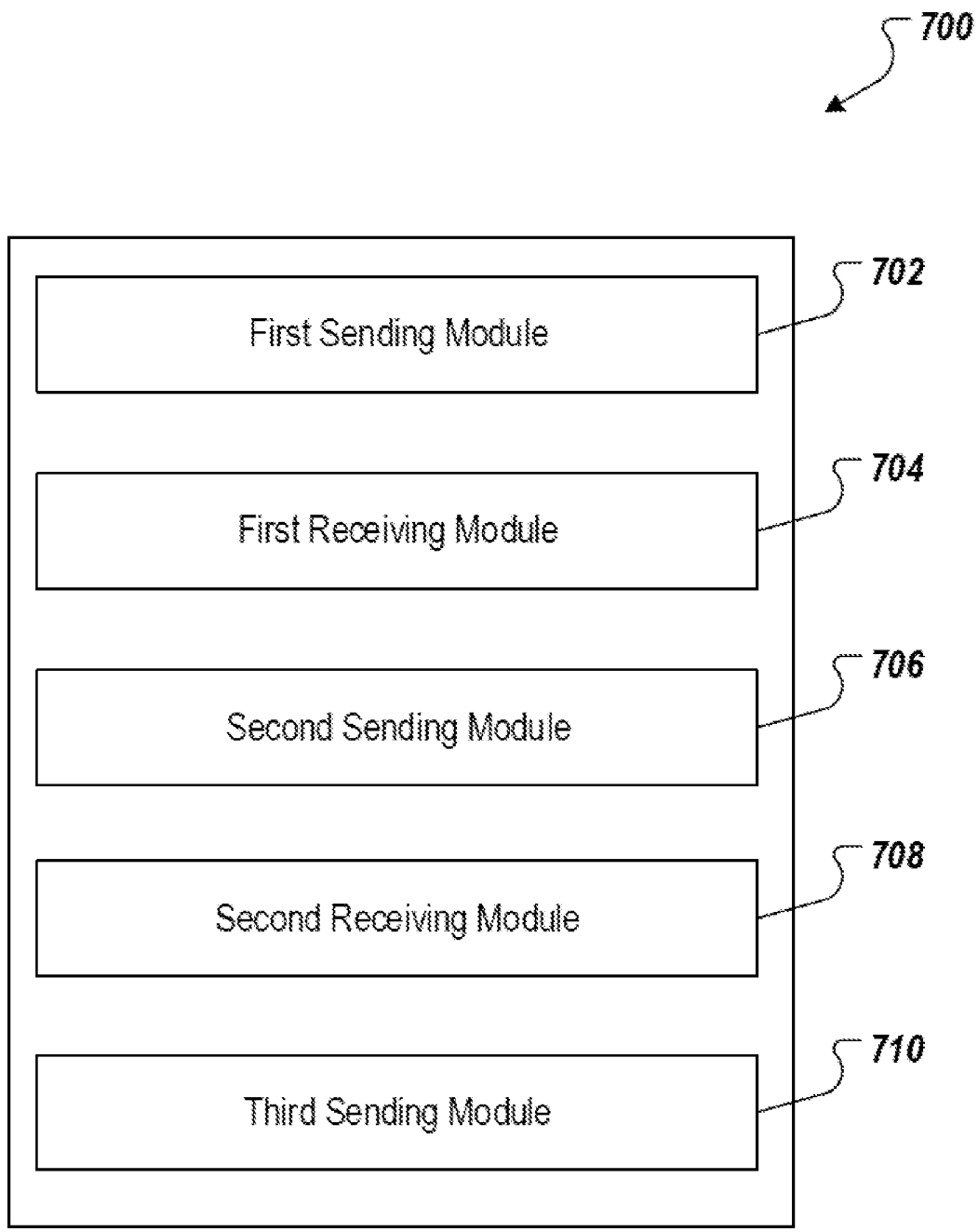
FIG. 7 is a diagram illustrating an example of modules of an apparatus in accordance with embodiments of this specification.

FIG. 7 is a diagram illustrating an example of modules of an apparatus 700 in accordance with embodiments of this specification. The apparatus 700 can be an example embodiment of a relay system controller. The apparatus 700 can correspond to the embodiments described above, and the apparatus 700 includes the following: a first sending module 702 that sends an attestation request that requests an attestation evidence from the relay system node to a relay system node, the attestation evidence indicating a validity of the relay system node; a first receiving module 704 that receives an attestation evidence of the relay system node from the relay system node, the attestation evidence of the relay system node comprising a measurement value of the relay system node, a public key of the relay system node, and a digital signature of the relay system node; a second sending module 706 that sends the attestation evidence of the relay system node to an attestation verification server; a second receiving module 708 that receives an attestation verification report from the attestation verification server, the attestation verification report comprising the attestation evidence of the relay system node, an attestation verification result, and a digital signature of the attestation verification server; and a third sending module 710 that sends the attestation verification report to a relay system smart contract.

In an optional embodiment, the measurement value of the relay system node comprises a hash value of a process code that is implemented on the relay system node.

In an optional embodiment, the digital signature of the relay system node comprises the measurement value and the public key of the relay system node that are signed using an attestation private key of the relay system node.

In an optional embodiment, the digital signature of the relay system node in the attestation evidence of the relay system node is verified by the attestation verification server using an attestation public key of the attestation verification server prior to the attestation verification server sending the attestation verification report to the relay system controller.

In an optional embodiment, the relay system smart contract executes on a blockchain network node of a blockchain network, and wherein the relay system controller and the relay system node are located external to the blockchain network.

In an optional embodiment, prior to sending the attestation request, the relay system smart contract obtains a measurement value of the relay system node and stores the measurement value in the relay system smart contract.

In an optional embodiment, the relay system smart contract determines whether the attestation verification report is valid. In response to determining that the attestation verification report is valid, the relay system smart contract determines that the public key of the relay system is valid. The relay system smart contract stores the public key of the relay system node in the relay system smart contract.

In an optional embodiment, the relay system smart contract determines whether the digital signature of the attestation verification server is valid. The relay system smart contract determines whether the measurement value of the relay system node that is in the attestation verification report matches a measurement value of the relay system node that the relay system smart contract obtains from the relay system controller.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 7, it can be interpreted as illustrating an internal functional module and a structure of an attestation verification apparatus. The attestation verification apparatus can be an example of a relay system controller. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification.

The techniques described in this specification produce one or more technical effects. For example, embodiments of this specification ensure the integrity of responses provided back to the blockchain network from external data sources. Accordingly, embodiments of the present disclosure improve the integrity of communications between a blockchain network, and components of a relay system that is used to retrieve data that is external to the blockchain network. In this manner, potential attack channels for malicious users are mitigated to enhance security. As another example, the relay system of this specification facilitates avoiding a direct contact between the user and the relay system node, thereby avoiding exposing a position or access point of the relay system node. As such, the relay system node is less likely to be found and attacked by malicious actors over the network in many forms, such as, for example, DDoS attacks. This improves a security of the relay system node, thereby further improving a security of the communication between the blockchain network and the relay system node.

Described embodiments of the subject matter can include one or more features, alone or in combination. For example, in a first embodiment, a method for performing attestation verification includes: sending, by a relay system controller and to a relay system node, an attestation request that requests an attestation evidence from the relay system node, the attestation evidence indicating a validity of the relay system node; receiving, at the relay system controller and from the relay system node, an attestation evidence of the relay system node, the attestation evidence of the relay system node comprising a measurement value of the relay system node, a public key of the relay system node, and a digital signature of the relay system node; sending, by the relay system controller and to an attestation verification server, the attestation evidence of the relay system node; receiving, by the relay system controller and from the attestation verification server, an attestation verification report, the attestation verification report comprising the attestation evidence of the relay system node, an attestation verification result, and a digital signature of the attestation verification server; and sending, by the relay system controller and to a relay system smart contract, the attestation verification report.

A first feature, combinable with any of the following features, specifies that the measurement value of the relay system node comprises a hash value of a process code that is implemented on the relay system node.

A second feature, combinable with any of the previous or following features, specifies that the digital signature of the relay system node comprises the measurement value and the public key of the relay system node that are signed using an attestation private key of the relay system node.

A third feature, combinable with any of the previous or following features, specifies that the digital signature of the relay system node in the attestation evidence of the relay system node is verified by the attestation verification server using an attestation public key of the attestation verification server prior to the attestation verification server sending the attestation verification report to the relay system controller.

A fourth feature, combinable with any of the previous or following features, specifies that the relay system smart contract executes on a blockchain network node of a blockchain network, and wherein the relay system controller and the relay system node are located external to the blockchain network.

A fifth feature, combinable with any of the previous or following features, specifies that, prior to sending the attestation request, the relay system smart contract obtains a measurement value of the relay system node and stores the measurement value in the relay system smart contract.

A sixth feature, combinable with any of the previous or following features, specifies that the method further includes: relay system smart contract determines whether the attestation verification report is valid; in response to determining that the attestation verification report is valid, the relay system smart contract determines that the public key of the relay system is valid; and the relay system smart contract stores the public key of the relay system node in the relay system smart contract.

A seventh feature, combinable with any of the previous or following features, specifies that the relay system smart contract determines whether the digital signature of the attestation verification server is valid, or determines whether the measurement value of the relay system node that is in the attestation verification report matches a measurement value of the relay system node that the relay system smart contract obtains from the relay system controller.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for performing an attestation verification, the method comprising:

receiving, by a relay system controller and from a relay system smart contract on a blockchain network, an attestation request that requests an attestation evidence from a relay system node, the attestation evidence indicating a validity of the relay system node;

sending, by the relay system controller and to the relay system node, the attestation request that requests the attestation evidence from the relay system node;

receiving, at the relay system controller and from the relay system node, an attestation evidence of the relay system node, the attestation evidence of the relay system node comprising a measurement value of the relay system node, a public key of the relay system node, and a digital signature of the relay system node, wherein the digital signature of the relay system node is generated using an attestation private key of the relay system node;

sending, by the relay system controller and to an attestation verification server, the attestation evidence of the relay system node;

receiving, by the relay system controller and from the attestation verification server, an attestation verification report, the attestation verification report comprising the attestation evidence of the relay system node, an attestation verification result, and a digital signature of the attestation verification server; and sending, by the relay system controller and to the relay system smart contract, the attestation verification report;

determining, by the relay system smart contract, whether the attestation verification report is valid;

in response to determining that the attestation verification report is valid, determining, by the relay system smart contract, that the public key of the relay system is valid;

storing, by the relay system smart contract, the public key of the relay system node in the relay system smart contract; and wherein determining, by the relay system smart contract, whether the attestation verification report is valid comprises at least one of the following:

determining, by the relay system smart contract, whether the digital signature of the attestation verification server is valid; or determining, whether the measurement value of the relay system node that is in the attestation verification report matches a measurement value of the relay system node that the relay system smart contract obtains from the relay system node.

2. The method of claim 1, wherein the measurement value of the relay system node comprises a hash value of a process code that is implemented on the relay system node.

3. The method of claim 1, wherein the digital signature of the relay system node comprises the measurement value and the public key of the relay system node that are signed using the attestation private key of the relay system node.

4. The method of claim 1, wherein the digital signature of the relay system node in the attestation evidence of the relay system node is verified by the attestation verification server using an attestation public key of the attestation verification server prior to the attestation verification server sending the attestation verification report to the relay system controller.

5. The method of claim 1, wherein the relay system smart contract executes on a blockchain network node of the blockchain network, and wherein the relay system controller and the relay system node are located external to the blockchain network.

6. The method of claim 1, wherein, prior to sending the attestation request, the method further comprises:
obtaining, by the relay system smart contract and from the relay system node, a measurement value of the relay system node; and
storing, by the relay system smart contract, the measurement value of the relay system node to the relay system smart contract.

7. A non-transitory, computer-readable storage medium storing one or more instructions executable by a computer system to perform operations for performing an attestation verification, the operations comprising:
receiving, by a relay system controller and from a relay system smart contract on a blockchain network, an attestation request that requests an attestation evidence from a relay system node, the attestation evidence indicating a validity of the relay system node;
sending, by the relay system controller and to the relay system node, the attestation request that requests the attestation evidence from the relay system node;
receiving, at the relay system controller and from the relay system node, an attestation evidence of the relay system node, the attestation evidence of the relay system node comprising a measurement value of the relay system node, a public key of the relay system node, and a digital signature of the relay system node, wherein the digital signature of the relay system node is generated using an attestation private key of the relay system node;
sending, by the relay system controller and to an attestation verification server, the attestation evidence of the relay system node;
receiving, by the relay system controller and from the attestation verification server, an attestation verification report, the attestation verification report comprising the attestation evidence of the relay system node, an attestation verification result, and a digital signature of the attestation verification server; and
sending, by the relay system controller and to the relay system smart contract, the attestation verification report;
determining, by the relay system smart contract, whether the attestation verification report is valid;
in response to determining that the attestation verification report is valid, determining, by the relay system smart contract, that the public key of the relay system is valid;
storing, by the relay system smart contract, the public key of the relay system node in the relay system smart contract; and
wherein determining, by the relay system smart contract, whether the attestation verification report is valid comprises at least one of the following:
determining, by the relay system smart contract, whether the digital signature of the attestation verification server is valid; or
determining, whether the measurement value of the relay system node that is in the attestation verification report matches a measurement value of the relay system node that the relay system smart contract obtains from the relay system node.

8. The non-transitory, computer-readable storage medium of claim 7, wherein the measurement value of the relay system node comprises a hash value of a process code that is implemented on the relay system node.

9. The non-transitory, computer-readable storage medium of claim 7, wherein the digital signature of the relay system node comprises the measurement value and the public key of the relay system node that are signed using the attestation private key of the relay system node.

10. The non-transitory, computer-readable storage medium of claim 7, wherein the digital signature of the relay system node in the attestation evidence of the relay system node is verified by the attestation verification server using an attestation public key of the attestation verification server prior to the attestation verification server sending the attestation verification report to the relay system controller.

11. The non-transitory, computer-readable storage medium of claim 7, wherein the relay system smart contract executes on a blockchain network node of the blockchain network, and wherein the relay system controller and the relay system node are located external to the blockchain network.

12. The non-transitory, computer-readable storage medium of claim 7, wherein, prior to sending the attestation request, the operations further comprise:
obtaining, by the relay system smart contract and from the relay system node, a measurement value of the relay system node; and
storing, by the relay system smart contract, the measurement value of the relay system node to the relay system smart contract.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for performing an attestation verification, the operations comprising:
receiving, by a relay system controller and from a relay system smart contract on a blockchain network, an attestation request that requests an attestation evidence from a relay system node, the attestation evidence indicating a validity of the relay system node;
sending, by the relay system controller and to the relay system node, the attestation request that requests the attestation evidence from the relay system node;
receiving, at the relay system controller and from the relay system node, an attestation evidence of the relay system node, the attestation evidence of the relay system node comprising a measurement value of the relay system node, a public key of the relay system node, and a digital signature of the relay system node, wherein the digital signature of the relay system node is generated using an attestation private key of the relay system node;

sending, by the relay system controller and to an attestation verification server, the attestation evidence of the relay system node;

receiving, by the relay system controller and from the attestation verification server, an attestation verification report, the attestation verification report comprising the attestation evidence of the relay system node, an attestation verification result, and a digital signature of the attestation verification server; and sending, by the relay system controller and to the relay system smart contract, the attestation verification report;

determining, by the relay system smart contract, whether the attestation verification report is valid;

in response to determining that the attestation verification report is valid, determining, by the relay system smart contract, that the public key of the relay system is valid;

storing, by the relay system smart contract, the public key of the relay system node in the relay system smart contract; and wherein determining, by the relay system smart contract, whether the attestation verification report is valid comprises at least one of the following:

determining, by the relay system smart contract, whether the digital signature of the attestation verification server is valid; or determining, whether the measurement value of the relay system node that is in the attestation verification report matches a measurement value of the relay system node that the relay system smart contract obtains from the relay system node.

14. The system of claim 13, wherein the measurement value of the relay system node comprises a hash value of a process code that is implemented on the relay system node.

15. The system of claim 13, wherein the digital signature of the relay system node comprises the measurement value and the public key of the relay system node that are signed using the attestation private key of the relay system node.

16. The system of claim 13, wherein the digital signature of the relay system node in the attestation evidence of the relay system node is verified by the attestation verification server using an attestation public key of the attestation verification server prior to the attestation verification server sending the attestation verification report to the relay system controller.

17. The system of claim 13, wherein the relay system smart contract executes on a blockchain network node of the blockchain network, and wherein the relay system controller and the relay system node are located external to the blockchain network.

18. The system of claim 13, wherein, prior to sending the attestation request, the operations further comprise:

obtaining, by the relay system smart contract and from the relay system node, a measurement value of the relay system node; and storing, by the relay system smart contract, the measurement value of the relay system node to the relay system smart contract.

* * * * *